June 26, 1962     A. J. S. UDALL     3,040,988
APPARATUS FOR EVALUATING THE RATE OF CHANGE OF A VARIABLE
Filed July 13, 1954     2 Sheets-Sheet 1

INVENTOR
A. J. S. Udall
BY
ATTORNEYS

United States Patent Office 3,040,988
Patented June 26, 1962

3,040,988
APPARATUS FOR EVALUATING THE RATE OF CHANGE OF A VARIABLE
Anthony John Shawcross Udall, Addleston, England, assignor to Electric & Musical Industries Limited, Middlesex, England, a company of Great Britain
Filed July 13, 1954, Ser. No. 442,957
Claims priority, application Great Britain July 17, 1953
2 Claims. (Cl. 235—183)

This invention relates to apparatus for evaluating the rate of change of a variable.

In some forms of computing apparatus, the need arises for evaluating the rate of change of a dependent variable (say displacement) with respect to an independent variable (say time), from a set of observations of the dependent variable made at equally spaced discrete values of the independent variable. The observed values of the dependent variable may be represented for example as alternating voltages having amplitudes representing the observed values, the voltages being stored in suitable stores, to enable the rate evaluation to be effected. The stored values are, however, in general subject to observational errors of a random character and it is therefore desirable to smooth the evaluated rate, usually in such a way as to reduce to a minimum the mean square deviation between the observed values of the dependent variable and the corresponding set of values represented by the smooth rate.

In the specifications of United States Patents Nos. 2,887,270 and 2,848,159 apparatus is described for evaluating a smoothed rate of change of a first variable with respect to a second variable, the rate being smoothed in such a way as to satisfy the least square criterion. The arrangements described in the prior specifications have, however, a disadvantage inasmuch as the output is obtained at a high impedance. An output at low impedance is usually desirable and consequently the arrangements described in the prior specifications usually need to be followed by an impedance converter, which may take the form of servo-mechanism or a feedback amplifier.

The object of the present invention is to reduce this disadvantage by providing apparatus which can produce the output representative of the smoothed rate at a low impedance.

In the arrangements according to the aforesaid prior specifications, alternating voltages having amplitudes representative of observed values of the first variable are applied via resistors to taps on an inductive potentiometer, the turns of which are tightly coupled one to another, the location of the taps being representative of values of the second variable corresponding to the observed values of the first variable. The potentiometer is floating, that is it is not tied to any reference potential and provided the potentiometer has a very high shunt impedance it can be shown that the voltages at the taps assume values corresponding to a linear voltage gradient along the potentiometer, which gradient represents the desired smoothed rate of change.

According to the present invention there is provided apparatus for evaluating the rate of change of a first variable with respect to a second variable, comprising at least three sources of alternating voltages having amplitudes representing observed values of the first variable for successive discrete values of the second variable, a series of transformer windings to which said alternating voltages are respectively applied and which are so arranged that the voltages across said windings vary in accordance with the differences between the applied voltages and a set of voltages having amplitudes corresponding to a smoothed rate of change, said transformer windings being so coupled as to cause said smoothed rate to be the desired rate of change, and means for deriving a signal representing said smoothed rate of change.

As will hereinafter appear no limitation need be imposed on the impedances of the transformers in order to satisfy the smoothing requirements. In one form of the present invention the set of values representing the smoothed rate of change are explicitly set up. In another form of the present invention the set of values representing the smoothed rate of change are not explicitly set up but are implicit in the functioning of the machine.

In order that the invention may be clearly understood and readily carried into effect, the invention will be described with reference to the accompanying drawings.

Figure 1:
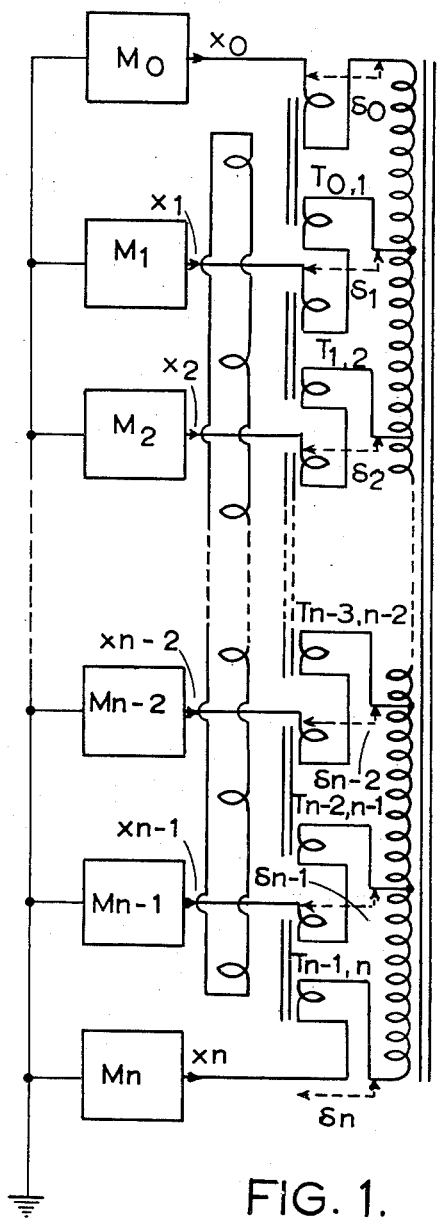
FIGURE 1 illustrates one example of the first form of the present invention.

The apparatus shown in FIGURE 1 consists of a transformer T, which has taps on its primary winding $T_p$ connected respectively to stores $M_0$ to $M_n$. The primary winding is not tied to any reference potential. There are an equal number of turns in the primary winding between adjacent taps and the turns of the primary winding are so tightly coupled that a linear voltage gradient is maintained along the primary winding when voltages are set up in the stores $M_0$ to $M_n$. It will be assumed that the function whose rate of change is to be evaluated is a function of time and the taps on the primary winding of the transformer T represent equi-spaced instants. It is arranged that the stores $M_0$ to $M_n$ store alternating voltages having amplitudes representing values of the function at the instants represented by the taps, the alternating voltages all having the same frequency and phase and being produced with reference to a common reference point, for example, earth. These alternating voltages are denoted in the drawing by $x_0, x_1 \ldots x_n$. The function may for example be the displacement of a target which is continuously tracked by radar or optical scanning means, and the value of the function may be sampled at discrete instants by means of apparatus such as described, for example, in the specification of United States Patent No. 2,882,524. In this case the stores $M_0$ to $M_n$ may consist of switched transformers of the kind illustrated in FIGURE 2 of the last-mentioned application. The apparatus further comprises a system of similar transformers $T_{0,1} \ldots T_{n-1,n}$ each having three coupled windings. One winding of the transformer $T_{0,1}$ is connected in the lead from the store $M_0$ to the corresponding tap on the transformer T and a second winding of this transformer is connected in the lead from the store $M_1$ to the transformer T. The transformer $T_{1,2}$ has one winding in the lead from the store $M_1$ and a second winding in the lead from the store $M_2$. The remaining transformers $T_{2,3} \ldots T_{n-1,n}$ are similarly connected. The third windings of the transformers $T_{0,1} \ldots T_{n-1,n}$ are connected in series and the first of these windings is connected to the last as shown. The right hand windings of the transformers $T_{0,1}$ to $T_{n-1,n}$ have all the same number of turns and the upper right hand winding of each of these transformers is wound in the opposite sense from the lower winding.

As aforesaid, the voltages set up at the taps on the transformer T represent a constant voltage gradient along the transformer, that is the voltage amplitude varies linearly along the transformer. Let the voltage amplitude at the taps be $a, a+v, a+2v, \ldots a+nv$. The difference between the stored voltage in the store $M_r$ and the voltage corresponding to the tap on the transformer T is then:

$$\delta_r = x_r - a - rv$$

The criterion for minimum mean square deviation is that $$\sum_{r=0}^{n}\delta_r^2 \equiv \sum_{r=0}^{n}(x_r-a-rv)^2$$

should be a minimum. Differentiating partially with respect to $a$ and $v$ gives $$\sum_{r=0}^{n}(x_r-a-rv)=0$$

$$\sum_{r=0}^{n}r(x_r-a-rv)=0$$

or $$\sum_{r=0}^{n}\delta_r=0$$

$$\sum_{r=0}^{n}r\delta_r=0$$

When the appropriate voltages $x_0 \ldots x_n$ are stored in the stores $M_0 \ldots M_n$, the voltage across the lower right hand winding $T_{n-1,n}$ of the transformer $T_{n-1}$ is $n$ and the voltage across the upper right hand winding of the same transformer is the negative of this. The voltage across the lower right hand winding of the transformer $T_{n-2,n-1}$ is therefore $\delta_n+\delta_{n-1}$ since the voltage across the two right hand windings in series is $\delta_{n-1}$. Similarly the voltage across the upper right hand winding of $T_{n-3,n-2}$ is $\delta_n+\delta_{n-1}+\delta_{n-2}$ and so on. The voltage across the upper right hand winding of $T_{1,2}$ is therefore $$\sum_{r=2}^{n}\delta_r$$

and of $T_{0,1}$ is $$\sum_{r=1}^{n}\delta_r$$

which must be equal to $-\delta_0$. Therefore $$\sum_{r=0}^{n}\delta_r=0$$

Moreover, since the left hand winding of the transformers $T_{0,1} \ldots T_{n-1,n}$ are connected in series the sum of the voltages across them is zero. Therefore starting from the bottom:

$$t\delta_n+t(\delta_n+\delta_{n-1})+t(\delta_n+\delta_{n-1}+\delta_{n-2})+ \ldots$$

$$+t\sum_{r=3}^{n}\delta_r+t\sum_{r=2}^{n}\delta_r+t\sum_{r=1}^{n}\delta_r=0$$

or $$\sum_{r=0}^{n}r\delta_r=0$$

where $t$ is the turns ratio of the left hand to the right hand windings. Both the conditions required to satisfy the minimum mean square criterion are therefore fulfilled. The voltage gradient along the primary winding T therefore represents the required smoothed rate of change and an alternating voltage with amplitude proportional to this smoothed rate of change can be obtained from the secondary winding $T_s$ of the transformer T. It will be observed that no condition is imposed as to the impedances of the transformers.

Figure 2:
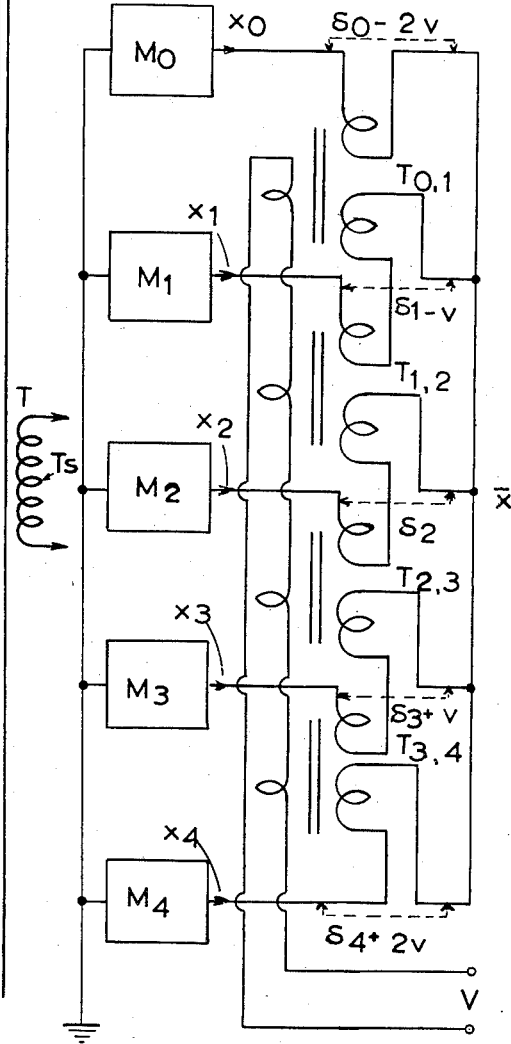
FIGURE 2 illustrates one example of the second form of the present invention.

The apparatus shown in FIGURE 2 is generally similar to FIGURE 1 but the transformer T is dispensed with and the leads from the stores $M_0$ to $M_n$ are connected to a common point which is floating. The left hand windings of the series of transformers $T_0$, $T_1$ etc., are moreover not short-circuited, the output of the apparatus being in fact derived from between opposite ends of this series of windings. In FIGURE 2 only five stores $M_1$ to $M_5$ are shown for convenience of description In describing the operation of FIGURE 2, an arbitrary rate $v$ measured in units of displacement per time interval between the observations of $x$ is assumed. Let the voltage at the common point to which the leads of the memory are connected by $\bar{x}$. This can be regarded as the middle point of a set of values of $x$ representing a constant rate of change. The voltages across various windings in the series of transformers $T_{0,1}$, $T_{1,2}$ etc. are then as shown in the drawing. By proceeding in a similar way as for FIGURE 1 it can be shown that $$(\delta_4+2v)+(\delta_3+v)+\delta_2+(\delta_1-v)+(\delta_0-2v)=0$$

or $$\sum_{r=0}^{4}\delta_r=0$$

and $$V=(\delta_4+2v)+(\delta_4+\delta_3+3v)+(\delta_4+\delta_3+\delta_2+3v)$$
$$+(\delta_4+\delta_3+\delta_2+\delta_1+2v)$$

or $$V=\sum_{r=0}^{4}r\delta_r+10v$$

the turns ratio between right and left hand windings of the transformers $T_{0,1}$, $T_{1,2}$, etc. is assumed to be unity.

Extending the analysis to $n+1$ stored values the relationships become $$\sum_{r=0}^{n}\delta_r=0$$

and $$V=\sum_{r=0}^{n}r\delta_r+\frac{n(n+1)(n+2)}{12}v$$

if $v'$ is the value of $v$ (which is arbitrary) such that $$\sum_{r=0}^{n}r\delta_r=0$$

then $v'$ is the required rate and $$V=\frac{n(n+1)(n+2)}{12}v'$$

The output V is therefore a multiple of the required smoothed rate.

Figure 3:
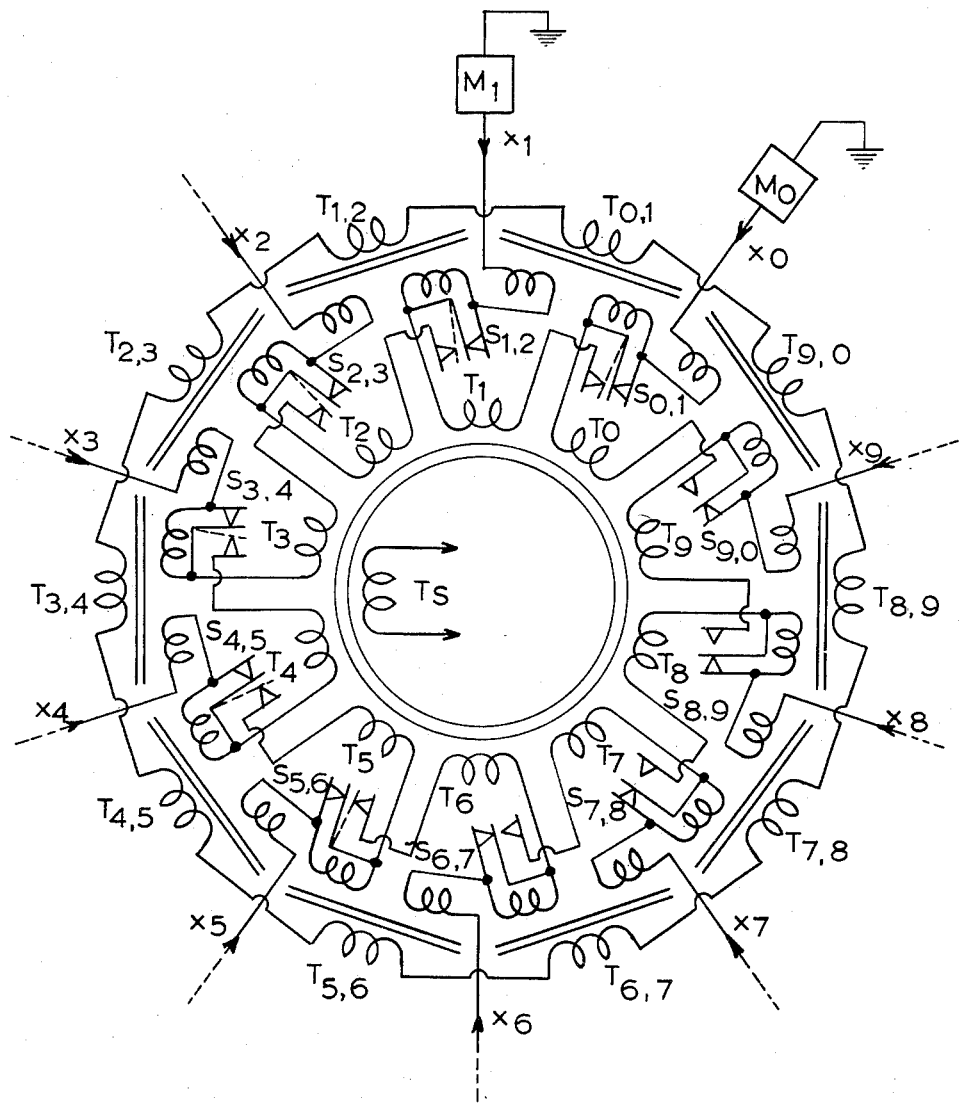
FIGURE 3 illustrates in greater detail a practical arrangement according to FIGURE 1.

FIGURE 3 shows a cyclic arrangement of the apparatus illustrated in FIGURE 1. The primary winding of the transformer T is divided into ten sections $T_0$, $T_1 \ldots T_9$ with switches $S_{0,1}$, $S_{1,2} \ldots S_{9,0}$ connected between the different sections. The leads from the stores $M_0$ to $M_9$ are also connected to the switches through the appropriate windings in the system of transformers $T_{0,1}$, $T_{1,2}$ etc. With the switches in the positions shown in FIGURE 3, the apparatus is inoperative but in changing any group of adjacent switches to the position shown in the dotted lines for the group $S_{0,1} \ldots S_{5,6}$ a smoothed rate can be derived from the voltages in the stores $M_0 \ldots M_6$, in the manner described with reference to FIGURE 1. Moreover, by arranging that the switches are changed in condition in a predetermined cyclic order, the stores in use can be changed in a cyclic order as described in the aforesaid specification of United States Patent No. 2,848,159 for the purpose of clearing the stores and injecting new observations, so that the evaluation of a smoothed rate can be effected continuously.

What I claim is:

1. Apparatus for evaluating the rate of change of a first variable with respect to a second variable comprising a number, greater than 2, of sources of alternating voltage each having two output terminals, said sources being arranged notionally in order, means interconnecting one terminal of all said sources to a common reference point, said sources producing output voltages at their respective other output terminals with respect to said common reference point which represent observed values of said first variable at successive discrete values of said second variable in said order, an autotransformer floating with respect to said common reference point, conductive connections one from each of said other output terminals of said sources to different taps on said autotransformer representing the corresponding values of the second variable, a number of transformers, one for each pair of sources adjacent in said order, each of said transformers having one winding in each connection from the respective sources to said taps on said autotransformer, means for substantially evaluating the algebraic sum of the fluxes in all the transformer windings in said connections and means for deriving an output signal in response to the flux in said autotransformer whereby said output signal represents a smoothed rate of change of said first variable with respect to said second variable.

2. Apparatus for evaluating the rate of change of a first variable with respect to a second variable, comprising a number, greater than 2, of sources of alternating voltage each having two output terminals, said sources being arranged notionally in order, means interconnecting one output terminal of all said sources to a common reference point, said sources producing output voltages at their respective other output terminals with respect to said common reference point which represent observed values of said first variable in said order, an autotransformer floating with respect to said common reference point, conductive connections one from each of said other output terminals of said sources to different taps on said autotransformer representing the corresponding values of the second variable, a number of transformers, one for each pair of sources adjacent in said order, each of said transformers having one winding in each connection from the respective sources to said taps on said autotransformer, said further windings being connected in series and a first of said further windings being connected in series and a first of said further windings being connected directly to the last of said windings so as to form a closed ring, and means for deriving an output signal in response to the flux in said autotransformer, whereby said output signal represents a smoothed rate of change of said first variable with respect to said second variable.

References Cited in the file of this patent
UNITED STATES PATENTS

| | | |
|---|---|---|
| 1,315,539 | Carson | Sept. 9, 1919 |
| 2,525,124 | Gallaway et al. | Oct. 10, 1950 |
| 2,540,807 | Berry | Feb. 6, 1951 |
| 2,558,430 | Goldberg | June 26, 1951 |